UNITED STATES PATENT OFFICE.

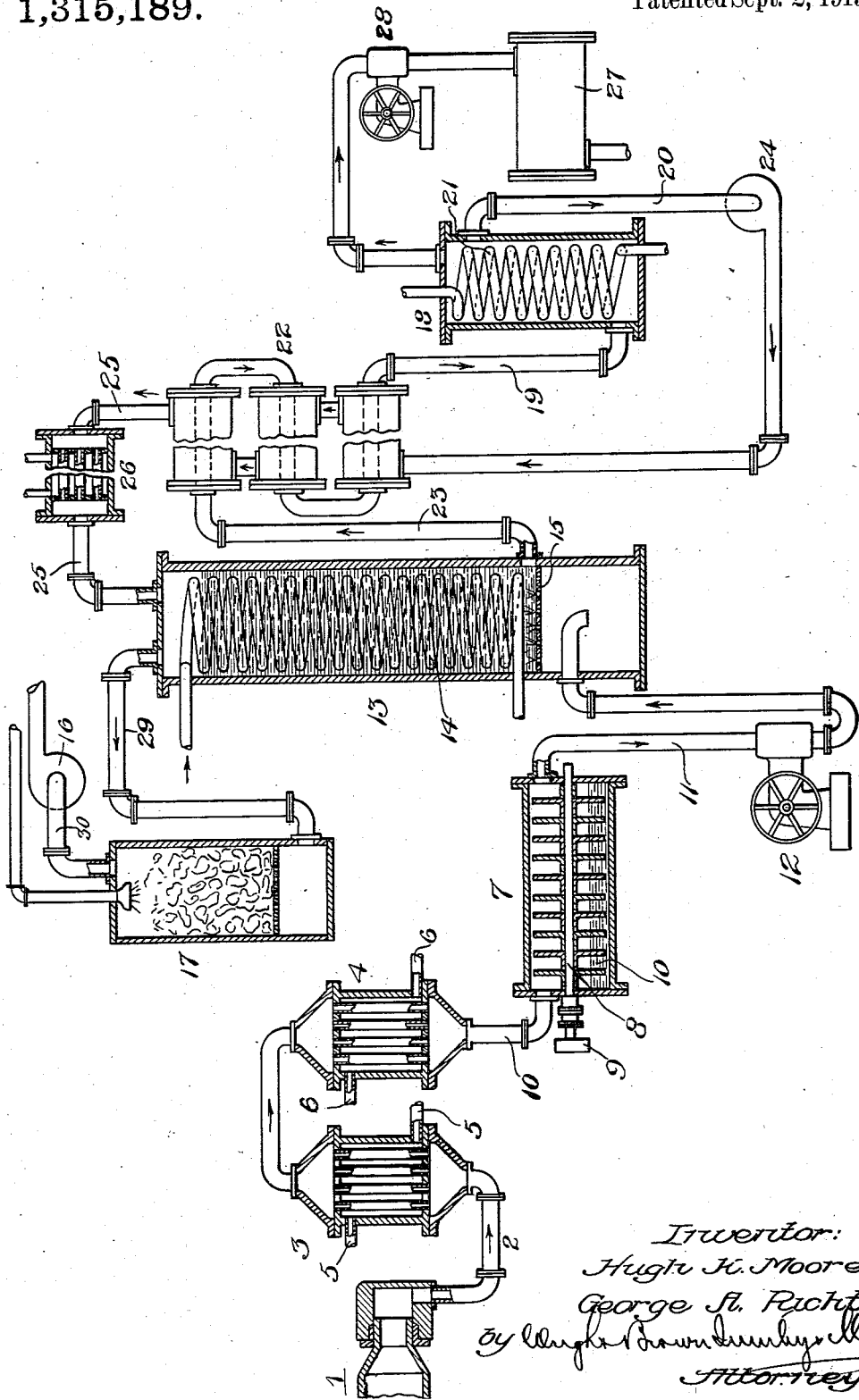

HUGH K. MOORE AND GEORGE A. RICHTER, OF BERLIN, NEW HAMPSHIRE, ASSIGNORS TO BROWN COMPANY, OF BERLIN, NEW HAMPSHIRE, A CORPORATION OF MAINE.

METHOD AND APPARATUS FOR RECOVERING SULFUR DIOXID.

1,315,189.  Specification of Letters Patent.  Patented Sept. 2, 1919.

Application filed November 16, 1917. Serial No. 202,296.

*To all whom it may concern:*

Be it known that we, HUGH K. MOORE and GEORGE A. RICHTER, citizens of the United States, residing at Berlin, in the county of Coos and State of New Hampshire, have invented new and useful Improvements in Methods and Apparatus for Recovering Sulfur Dioxid, of which the following is a specification.

This invention relates to the production of sulfur dioxid and has for its object to provide a method and apparatus for separating substantially pure sulfur dioxid from the products of combustion from a sulfur-burning furnace.

We have discovered that there are certain liquid substances containing no water, which, while inert in respect of sulfur dioxid, are capable of dissolving or absorbing the gas to the practical exclusion of nitrogen and other products resulting from the combustion of sulfur in air. Among these substances are oils of a vegetable, mineral or animal nature, and the alcohols such as glycerin, though of these some give better results than others when practically employed.

According to the present invention, the burner gases are brought into the presence of the absorbent, and the sulfur dioxid is selectively absorbed, after which the said gas is expelled from the absorbent in a state of comparative purity.

The burner gases, which comprise nitrogen, oxygen and sulfur dioxid, are first dried or dehydrated and are then brought into the presence of the non-aqueous liquid by which the sulfur dioxid is absorbed or dissolved, and the liquid is subsequently heated to drive off the gas, after which, on being cooled, it is again ready to receive a fresh charge of gas. In practice, the liquid absorbent is circulated through a charging tank in which the gas is absorbed thereby, and then through a discharging tank in which the gas is discharged, the absorbent being alternately refrigerated and heated. We find it economical to pass the absorbent through a heat exchanger by which the gas-free stream of absorbent on its way to the charging tank is cooled, and the gas-charged stream on its way to the discharging tank is preliminarily heated. The gas liberated in the discharging tank is collected and preferably though not necessarily recovered in liquid form.

Referring again to the absorbent,—it should have certain characteristics to secure optimum results, e. g. the liquid must contain no water, it must neither freeze nor vaporize easily, must not readily break up when heated, and should not readily foam. We have found that unsaturated oils of a vegetable origin have given the best results, especially those containing relatively large proportions of the glycerids of the fatty acids lower in saturation than olein, such as soya bean oil and cottonseed oil, preferably "winter oils", from which a portion of the glycerids of the saturated acids have been expressed. Before use the oil should be carefully dehydrated, and it then may be used for a relatively long time.

By employing an absorbent containing no water and dehydrating the gas, sulfur dioxid may be commercially handled with as little effect upon the containing tanks and conduits as air, and consequently, instead of forming these instruments of lead, bronze or other expensive material, they may be made of iron or other inexpensive substance. Again, by employing a liquid solvent, such as herein described, it does not have to be heated to the same extent as does water or an aqueous solution in order to expel the gas. For example, the specific heat of glycerin or oil is but a fraction of that of water, and consequently requires the expenditure of but a relatively small percentage of the heat units to bring it to a gas-expelling temperature that would be required for water or an aqueous solution, and hence we effect a saving in fuel. Moreover where water or a water-containing substance is heated to a gas-expelling or gas-liberating temperature, a part of the water is carried over as steam which must be removed, thereby causing a loss in gas, and also a considerable loss in heat.

On the accompanying drawings, we have conventionally illustrated instrumentalities which may be employed for the separation and recovery of sulfur dioxid.

At 1 is represented a burner for sulfur or sulfur-bearing materials, from which the products of combustion pass through a pipe or conduit 2 to a cooler 3 by which they are preliminarily cooled. Thence the gases pass to a condenser 4 in which most of the moisture is eliminated. Water may be passed through the cooler 3, and refrigerated brine or other refrigerant through the condenser 4, the inlet and outlet pipes for the cooling and refrigerating media being indicated at 5—5 and 6—6 respectively. Any suitable type of cooler and condenser may be employed. The gases, minus those which are condensed (and which have a higher point of volatilization than that of sulfur dioxid), leave the refrigerator at approximately from 0° to 5° C. with most of the water eliminated, the products of condensation passing out through a pipe equipped with a trap (not shown). The partially dried gases then pass to a dehydrator 7 of suitable form and construction. We have found that for the purpose, a dehydrating apparatus, such as conventionally shown, may be employed with excellent results. It consists of a horizontally arranged cylinder having an axially arranged rotary shaft 8 driven by a pulley 9 and having secured thereon a plurality of perforated disks 10 which dip into a pool of sulfuric acid or other dehydrating agent. The refrigerated gases entering one end of the cylinder through the pipe 10 are drawn therefrom through the pipe 11 by a vacuum and force pump 12. The gases are now refrigerated and dehydrated and are ready to be brought into the presence of the absorbent.

The charging tank or absorber is conventionally illustrated at 13 and it may be of any suitable or commercial design. As illustrated, it consists of an upright cylinder containing a refrigerating coil 14 above a perforated diaphragm 15. This tank contains the absorbent, preferably soya bean or cottonseed oil. The gases and the absorbent being both at a low temperature, the sulfur dioxid, on bubbling upwardly under pressure through the perforated diaphragm, is readily absorbed by the oil. The nitrogen and other inert gases and any other unabsorbed sulfur dioxid are drawn by pump 16 into a lime tower 17, from which the inert gases are removed by said pump. Instead of the form of absorber shown, we may employ one substantially like the instrumentality used in dehydrating the gases, in which the perforated disks dip into a pool of absorbent and carry the latter in thin films through the overlying body of gas.

The discharger, or discharging tank, is indicated conventionally at 18, and is shown as a closed tank to which the gas-laden absorbent is fed by a pipe 19 and from which, after being relieved of its gas, the absorbent is carried away through a pipe 20. Within the tank is a coil 21 for a heating medium such as steam at high pressure, and for heating the absorbent to a gas-liberating temperature. Between the absorber and the discharger we preferably locate any suitable form of heat exchanger, such for example as that indicated as a whole at 22. The chilled gas-laden absorbent is conducted thereto from the absorber by a pipe 23, and, after passing through a heat exchanger, is delivered to the pipe 19 and the discharger in a heated condition. A pump 24 forces the heated gas-free absorbent from the discharger through the pipe 20 to the heat exchanger, where, after passing therethrough and losing a part of its heat, it is led to the absorber by a pipe 25. Said absorbent may be caused to pass through a cooler 26 on its way from the heat exchanger to the absorber, as indicated on the drawing. From the upper portion of the discharger the sulfur dioxid, which is liberated by the heated absorbent, is pumped to a condensing, collecting and liquefying tank 27 (from which the gas may be drawn in liquid form) by a pump 28.

We have not attempted to illustrate the various instrumentalities in detail or to show them at their relative levels, or to indicate their relative dimensions, or to illustrate and describe the full complement of pumps, valves, and fittings which may be needed, for these are all matters calling for only the expected skill of those familiar with the art. It is not necessary, for example, that the absorbent be refrigerated in the absorber, since it may, if desired, be carried through a refrigerating apparatus instead of a cooler as it passes from the heat exchanger to the absorber.

In operation, that portion of the entire body of oil, which is circulating through the absorber, being in the presence of the mixed refrigerated burner gases bubbling thereinto, absorbs or dissolves the sulfur dioxid, and, laden therewith, on passing to the heat exchanger, is preliminarily heated. On reaching the discharger, the oil is heated to a temperature of say 100° to 150° C. and most of the gas dissolved therein is driven off, collected and recovered in liquid form. The substantially gas-free oil or absorbent then passing from the discharger through the heat exchanger and the cooler is preliminarily chilled and is then delivered to the absorber again for refrigeration and for receiving a fresh charge of gas.

The burner gases in the absorber, which are not absorbed and which usually comprise a small portion of sulfur dioxid, are in practice drawn into the lime tower 17 through a pipe 29 by the pump 16 located in an eduction pipe line 30, and the sulfur dioxid is thus recovered as calcium bisulfite. The nitrogen and other inert gas or gases are discharged into the atmosphere, or may be collected and recovered if desired.

The greater part of the apparatus, which we have described as being applicable for use in practising our invention, including the absorbing and discharging towers and the other instrumentalities and conduits which come into contact with the gas after it is dehydrated, may all be made of iron, or other ordinary materials, which would have to be used in constructing apparatus of the size of those necessary for commercial operation. Hence we effect large savings in the cost of construction and maintenance. Moreover, by employing as the absorbent a liquid having a specific heat less than 1 (i. e. water having a specific heat of 1, and the organic solvents described having a specific heat of approximately .4 which require the expenditure of a smaller number of B. T. U. to heat them to gas-expelling or gas-liberating temperatures), we are able to employ instrumentalities such for example as the discharger and the heat exchanger of much smaller size than would be otherwise required, and effect material savings in fuel consumption.

Having thus explained the nature of our said invention and described a way of making, using and practising the same, although without attempting to set forth all of the forms in which it may be made or all of the modes of its use or all of the various ways in which it may be practised, what we claim is:

1. A process of separating and recovering sulfur dioxid from the gaseous products of combustion of a sulfur-bearing material, which consists in separating said sulfur dioxid from the other gases by absorbing or dissolving it in a liquid non-aqueous absorbent, and then extracting and recovering said sulfur dioxid from such absorbent.

2. A process of separating and recovering sulfur dioxid from the gaseous products of combustion of a sulfur-bearing material, which consists in separating said sulfur dioxid from the other gases by absorbing or dissolving it in a liquid absorbent having a specific heat less than that of water, and then extracting and recovering said sulfur dioxid from said solvent.

3. A process of separating and recovering sulfur dioxid from the gaseous products of combustion of a sulfur-bearing material, which consists in separating said sulfur dioxid from the other gases by absorbing or dissolving it in oil, and then extracting said sulfur dioxid from said oil.

4. A process of separating and recovering sulfur dioxid from the gaseous products of combustion of a sulfur-bearing material, which consists in separating said sulfur dioxid from the other gases by absorbing or dissolving it in a non-aqueous absorbent liquid of vegetable origin, and then extracting and recovering such sulfur dioxid from said absorbent.

5. A process of separating and recovering sulfur dioxid from the gaseous products of combustion of a sulfur-bearing material, which consists in separating said sulfur dioxid from the other gases by absorbing or dissolving it in an oil of vegetable origin containing a large proportion of the glycerids of fatty acids of a lower saturation than olein, and then extracting such sulfur dioxid from said oil.

6. A process of separating and recovering sulfur dioxid from the gaseous products of combustion of sulfur-bearing material, which consists in bringing such gases into the presence of a body of refrigerated liquid non-aqueous absorbent and dissolving sulfur dioxid therein, separating such body of gas-laden absorbent from the remainder of said gases, then heating said body of absorbent to extract the sulfur dioxid therefrom, and collecting said last-mentioned gas.

7. A process of separating and recovering sulfur dioxid from the gaseous products of combustion of a sulfur-bearing material, which consists in circulating a body of non-aqueous liquid absorbent, refrigerating the absorbent in one portion of its path, dissolving in the refrigerated absorbent sulfur dioxid thus separated from the other said products of combustion, and heating the gas-laden absorbent in another portion of its path to liberate or extract the previously dissolved or absorbed sulfur dioxid.

8. A process of separating and recovering sulfur dioxid from the gaseous products of combustion of a sulfur-bearing material, which consists in circulating a body of liquid absorbent having a specific heat substantially less than that of water, refrigerating said absorbent in one portion of its path, bringing such refrigerated absorbent and said gases into contact and dissolving sulfur dioxid in said absorbent, and liberating or extracting said gas from said absorbent in another portion of its path.

9. A process of separating and recovering sulfur dioxid from the gaseous products of combustion of a sulfur-bearing material, which consists in circulating a body of oil, refrigerating said oil in one portion of its path, bringing such refrigerated oil and said gases, into contact and dissolving sulfur dioxid in said oil, and heating said gas-laden oil in another portion of its path and thereby liberating or extracting said sulfur dioxid from said oil.

10. A process of separating and recovering sulfur dioxid from the gaseous products of combustion of a sulfur-bearing material, which consists in causing a vegetable oil continuously to circulate from an absorbing tank to a discharging tank and vice versa, refrigerating said oil, passing said products of combustion into contact with such refrigerated oil in said absorbing tank to cause the absorption of sulfur dioxid, and extracting previously absorbed or dissolved sulfur dioxid from the oil in said discharging tank.

11. A process of separating and recovering sulfur dioxid from the gaseous products of combustion of a sulfur-bearing material, which consists in causing a vegetable oil continuously to circulate from an absorbing tank to a discharging tank and vice versa, refrigerating said oil, passing said products of combustion into contact with such refrigerated oil in said absorbing tank to cause the absorption of sulfur dioxid, and heating the gas-laden oil in the discharging tank to cause the extraction and liberation of the sulfur dioxid therefrom.

12. A process of separating and recovering sulfur dioxid from the gaseous products of combustion of a sulfur-bearing material, which consists in refrigerating such products of combustion and condensing certain of said products, dehydrating the remaining products, separating sulfur dioxid from such remaining products by dissolving it in a solvent containing no water, and subsequently extracting or liberating said previously dissolved sulfur dioxid from such solvent.

13. A process of separating and recovering sulfur dioxid from the gaseous products of combustion of a sulfur-bearing material, which consists in refrigerating such products of combustion and condensing certain of said products, dehydrating the remaining products, separating sulfur dioxid from such remaining products by dissolving it in oil, subsequently heating such gas-laden oil and liberating sulfur dioxid therefrom, and recovering said sulfur dioxid.

14. A process of separating and recovering sulfur dioxid from the gaseous products of combustion of a sulfur-bearing material, which consists in refrigerating such products of combustion and condensing certain of said products, dehydrating the remaining products, separating sulfur dioxid from such remaining products by dissolving it in an organic solvent, subsequently heating such gas-laden solvent and liberating sulfur dioxid therefrom, and then refrigerating the solvent for the subsequent dissolving therein of another charge of sulfur dioxid.

15. The herein described method of obtaining sulfur dioxid, which comprises the following steps: circulating a body of liquid absorbent containing no water, refrigerating said absorbent at one portion of its path; bringing into contact with the refrigerated absorbent at one portion of its path a continuous stream of gaseous products of combustion of a sulfur-bearing material, and dissolving sulfur dioxid therein; and liberating or extracting previously dissolved sulfur dioxid at another portion of the path of such absorbent.

16. The herein described method of obtaining sulfur dioxid, which comprises the following steps: circulating a body of oil, refrigerating said oil at one portion of its path, bringing said refrigerated and dehydrated oil at one portion of its path in the presence of the mixed gases comprising sulfur dioxid and dissolving sulfur dioxid in such refrigerated oil, and liberating the previously dissolved sulfur dioxid from such oil at another portion of its path, and recovering such sulfur dioxid.

17. The herein described method of obtaining sulfur dioxid, which comprises the following steps: circulating a body of oil, refrigerating said oil at one portion of its path, bringing said refrigerated oil at one portion of its path into the presence of the mixed gases comprising sulfur dioxid and dissolving sulfur dioxid in such refrigerated oil, and heating said gas-laden oil at another portion of its path to extract or liberate therefrom previously dissolved sulfur dioxid.

18. The combination of an absorber adapted to contain a liquid solvent of gas, a discharger, conduits connecting said absorber and discharger and including means for causing a circulation of the solvent from one to the other and vice versa, a refrigerating coil in the absorber for chilling the solvent, means for bringing the gas and solvent into contact in the absorber, and a heating coil in the discharger for heating the solvent therein.

19. The combination of an absorber adapted to contain a liquid solvent, a discharger, a circulating system connecting the same including a pump by which the solvent is caused to circulate from the absorber to the discharger and vice versa, means for chilling the solvent in the absorber, means in the discharger for heating the solvent therein, a source of mixed gases including sulfur dioxid, means for dehydrating such mixture and delivering the same to the absorber, and means for exhausting the sulfur dioxid from the discharger.

In testimony whereof we have affixed our signatures.

HUGH K. MOORE.
GEORGE A. RICHTER.